United States Patent
Srivastava et al.

(10) Patent No.: US 12,477,065 B2
(45) Date of Patent: *Nov. 18, 2025

(54) EMERGENCY COMMUNICATION SYSTEM WITH CONTEXTUAL SNIPPETS

(71) Applicant: Axon Enterprise, Inc., Scottsdale, AZ (US)

(72) Inventors: Anshuman Srivastava, Seattle, WA (US); Michael Bauer, Seattle, WA (US); Joseph Pepper, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,287

(22) Filed: Aug. 15, 2023

(65) Prior Publication Data

US 2023/0388416 A1    Nov. 30, 2023

Related U.S. Application Data

(63) Continuation of application No. 17/432,056, filed as application No. PCT/IB2020/062355 on Dec. 22, 2020, now Pat. No. 11,825,020.

(Continued)

(51) Int. Cl.
*H04W 4/22* (2009.01)
*H04M 3/42* (2006.01)
*H04M 3/51* (2006.01)

(52) U.S. Cl.
CPC ..... *H04M 3/5116* (2013.01); *H04M 3/42221* (2013.01); *H04M 2203/553* (2013.01)

(58) Field of Classification Search
CPC .. G08B 25/007; G08B 27/001; G08B 25/012; G06Q 10/06; G06Q 10/10; H04M 3/5116;
(Continued)

(56) References Cited

U.S. PATENT DOCUMENTS 6,252,946 B1    6/2001  Glowny et al.
7,336,172 B2 *  2/2008  Govindaraj .......... G08B 25/012
                                                340/517

(Continued)

FOREIGN PATENT DOCUMENTS

EP          3213494 A1    9/2017

OTHER PUBLICATIONS

Canadian Intellectual Property Office, Office Action for Canadian Application No. 3,162,531 mailed Aug. 25, 2023.
(Continued)

*Primary Examiner* — Md S Elahee
(74) *Attorney, Agent, or Firm* — Justin Powley

(57) ABSTRACT

Systems and methods for processing emergency communications are provided. A system may receive an emergency communication initiated by an emergency communicator. The system may detect a data field action in response to an emergency receiver entering a data input based on the emergency communication. The system may capture a timestamp of when the data field action occurred. The system may generate a communication snippet based on the action timestamp and a snippet length. The communication snippet may be configured to provide context from the emergency communication to the data input. The system may transmit the communication snippet and the data input to an emergency responder.

20 Claims, 7 Drawing Sheets

Related U.S. Application Data

(60) Provisional application No. 62/952,811, filed on Dec. 23, 2019.

(58) Field of Classification Search
CPC ........ H04M 3/42221; H04M 2203/553; G06F 16/739; H04W 4/90; H04L 67/10; H04L 65/601; G11B 27/034
USPC ........................................................ 704/206
See application file for complete search history.

(56) References Cited

U.S. PATENT DOCUMENTS

| | | |
|---|---|---|
| 8,538,374 B1 | 9/2013 | Haimo et al. |
| 9,547,977 B2 | 1/2017 | Will et al. |
| 9,715,901 B1 | 7/2017 | Singh et al. |
| 2013/0222133 A1 | 8/2013 | Schultz et al. |
| 2018/0053401 A1 | 2/2018 | Martin et al. |
| 2018/0248929 A1* | 8/2018 | Han .................. H04W 4/90 |
| 2019/0166480 A1 | 5/2019 | Rauner |

OTHER PUBLICATIONS

International Searching Authority, International Search Report and Written Opinion for International Patent Application PCT/IB2020/062355, p. 1-9.

European Patent Office, Extended European Search Report for European Application No. 20908082.9 mailed Dec. 12, 2023.

Canadian Patent Office, Office Action for Canadian Application No. 3,162,531 mailed Apr. 16, 2024.

Canadian Intellectual Property Office, Office Action for Canadian Application No. 3,162,531, mailed Apr. 29, 2025.

* cited by examiner

EMERGENCY COMMUNICATION SYSTEM WITH CONTEXTUAL SNIPPETS

CROSS-REFERENCE TO RELATED APPLICATIONS

This application is a continuation of, and claims priority to and the benefit of, U.S. patent application Ser. No. 17/432,056, filed on Aug. 18, 2021, and entitled "EMERGENCY COMMUNICATION SYSTEM WITH CONTEXTUAL SNIPPETS"; which was a national stage entry of International Patent Application No. PCT/IB2020/062355, filed on Dec. 22, 2020, and entitled "EMERGENCY COMMUNICATION SYSTEM WITH CONTEXTUAL SNIPPETS"; and which claimed priority to and the benefit of U.S. Provisional Patent Application No. 62/952,811, filed on Dec. 23, 2019, and entitled "EMERGENCY COMMUNICATION SYSTEM WITH CONTEXTUAL SNIPPETS". All of the above-referenced applications are incorporated by reference in their entirety.

FIELD

Embodiments of the present disclosure relate to an emergency communication system that provides contextual snippets of emergency communications.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
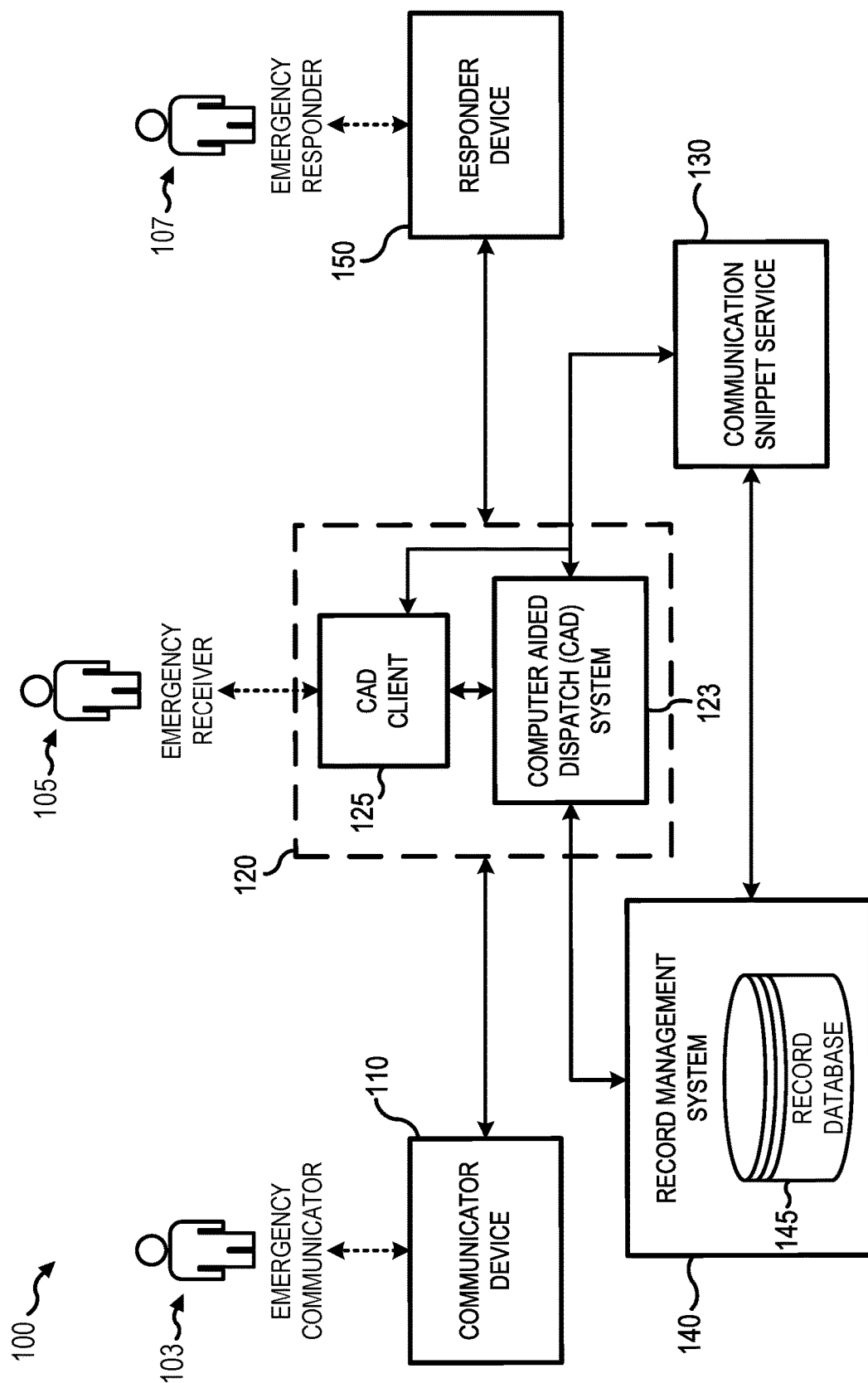
FIG. 1 is a block diagram illustrating system components of an emergency communication system, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

An emergency communicator may initiate an emergency communication with an emergency receiver. For example, the emergency communicator may desire to receive assistance from an emergency responder. The emergency receiver may act as an intermediary to relay the emergency communication to the emergency responder. The emergency communication may comprise audio, video, and/or text. For example, the emergency communicator may initiate the emergency communication by calling, texting, electronic-messaging, video chatting, etc. the emergency receiver. During the emergency communication, the emergency communicator may provide details regarding the emergency to the emergency receiver. The emergency receiver may ask questions and may input data (e.g., take notes, input data into a computer-based system, etc.) based on the emergency communication. For example, the emergency receiver may input data associated with the emergency, such as the emergency communicator's name, the emergency, the location of the emergency, details of the emergency, and/or the like. During the emergency communication, or after the emergency communication has ended, the emergency receiver may transmit (e.g., electronically, orally, etc.) the data input to an appropriate emergency responder. Based on the data input, the emergency responder may respond to the emergency from the emergency communication.

In various embodiments, an emergency communicator may include an individual, group of individuals, entity, or the like, desiring to report an emergency event (e.g., a crime, fire, medical emergency, etc.). The emergency communicator may initiate the emergency communication via a telecommunications device, computing device, and/or the like. The emergency communicator may initiate the emergency communication by calling an emergency telephone number via a telecommunications device. For example, in the United States the emergency telephone number of "911" may be used for police, ambulance, and fire services. In various embodiments, the emergency communication may also comprise a non-emergency event communicated via an emergency or non-emergency communication means for police, ambulance, fire services, animal control services, city utilities services, and/or the like.

In various embodiments, an emergency receiver may include a call operator, a call taker, a call dispatcher, or the like responsible for acting as an intermediary to relay the emergency event to the emergency responder. The emergency receiver may be located in an emergency communication center, a police station, a firehouse, and/or the like. The emergency receiver may be an individual or a group of individuals (e.g., a call taker and a call dispatcher). For example, the emergency receiver may be a single individual responsible for taking the incoming communication and coordinating an appropriate response with an emergency responder. As a further example, a first emergency receiver (e.g., a call taker) may receive the incoming communication, input data regarding the communication, and transmit the data input to a second emergency receiver. The second emergency receiver (e.g., a call dispatcher) may receive the data input and coordinate an appropriate response with an emergency responder. The second emergency receiver may also transmit the data input to the emergency responder. The emergency receiver may interact with a computer-based system to input data and perform additional operations associated with the emergency communication. The emergency receiver may include a system (e.g., a computer-based system) configured to at least partially receive the emergency communication and/or enable the emergency receiver to input data regarding the emergency communication.

In various embodiments, an emergency responder may include an individual, or group of individuals, that performs emergency (or non-emergency) services. For example, the emergency responder may be a law enforcement officer, a firefighter, an emergency medical technician (EMT), a paramedic, an ambulance technician, an animal control officer, a utility service personnel, and/or the like. The emergency responder may be a government employee or a private employee (e.g., a security guard). Typically, the emergency responder may receive the data input from the emergency receiver (e.g., call dispatcher) in a text-based format via a mobile data terminal (MDT), or other computer-based system, or in an audio-based format via a radio. The emergency responder may respond to the emergency communication based on the data input (and/or additional radio communications provided by the emergency receiver). As such, in typical systems and processes the emergency responder does not hear (e.g., audio) or see (e.g., video) any of the emergency communication before responding to the emergency. In that regard, and as a result of not hearing or seeing any of the emergency communication, the emergency responder may respond to the emergency without situational awareness and context that may be lost in the conversion of the emergency communication to the data inputs.

Systems, methods, and computer-readable mediums (collectively, the "system") for generating communication snippets are disclosed. The system may generate a communication snippet to comprise a portion of an emergency communication corresponding with a specific data input from an emergency receiver. The system may associate the communication snippet with a specific data input such that the emergency responder may interact with the communication snippet (e.g., visually, audibly, etc.) while also interacting with the specific data input. The communication snippet may be configured to provide situational awareness and/or context to emergency responders that the emergency responder may not already receive via the data input. For example, an emergency responder may listen or view the communication snippet to determine details that may have been missed in the data input, or details that could not be translated to the data input such as tone of voice, speech cadence, background noise, or similar audio or video characteristics. A communication snippet may also be referred to herein as a contextual snippet, a situational awareness snippet, an audio snippet, a video snippet, a text snippet, a contextual snippet, and/or any other similar term or phrase.

In various embodiments, and with reference to FIG. 1, an emergency communication system 100 ("system 100") is disclosed. System 100 may enable communications (e.g., emergency communications) between an emergency communicator 103, an emergency receiver 105, and/or an emergency responder 107. System 100 may comprise one or more devices, systems, environments, services, and/or the like configured to enable communications, support communications, and provide other functionalities and services discussed herein. For example, system 100 may comprise one or more of a communicator device 110, a communication environment 120, a communication snippet service 130, a record management system 140, and/or a responder device 150.

Emergency communicator 103 may initiate an emergency communication with emergency receiver 105. For example, emergency communicator 103 may interact with communicator device 110 to initiate an emergency communication with emergency receiver 105 (e.g., directly or via communication environment 120). Emergency communicator 103 may include any emergency communicator, user, or individual disclosed herein. Emergency receiver 105 may include any emergency receiver, call-taker, operator, dispatcher, and/or the like disclosed herein. An emergency communication may include any emergency communication, non-emergency communication, or similar communication disclosed herein.

In various embodiments, communicator device 110 (e.g., emergency communicator device, emergency device, etc.) may be configured to allow emergency communicator 103 to initiate, communicate, transmit, and/or complete an emergency communication with emergency receiver 105. Communicator device 110 may be in communication with communication environment 120. For example, and in accordance with various embodiments, communicator device 110 may be in communication with communication environment 120 via a telecommunications network (e.g., a telephonic communication). The telecommunications network may include a public switched telephone network (PSTN), a cellular network, a mobile network, a private telephone network (e.g., a private branch exchange (PBX)), an integrated services digital network (ISDN), and/or the like. As a further example, and in accordance with various embodiments, communicator device 110 may be in electronic communication with communication environment 120.

Communicator device 110 may comprise any combination of hardware and/or software components. For example, communicator device 110 may comprise hardware such as a processing unit, a communications unit, a memory unit, an input device, and/or an output device. Communicator device 110 may also comprise software configured to manage and/or interact with the hardware components, such as, for example, an operating system, user interfaces, software applications, and/or the like. In various embodiments, communicator device 110 may comprise a telecommunications device such as, for example, a landline telephone, an IP telephone, a mobile telephone, a cellular telephone, a smart telephone (e.g., IPHONE®, BLACKBERRY®, ANDROID®, etc.), and/or the like. In various embodiments, communicator device 110 may be a computing device such as a server, a computer-based system, a portable computer-based system (e.g., a laptop, a notebook, a hand held computer, a tablet, a personal digital assistant, etc.), a cellular telephone, a smart telephone, a wearable device (e.g., a smart watch, smart glasses, etc.), an internet of things (IoT) device, and/or any other device capable of transmitting and/or receiving data over a network. In various embodiments, communicator device 110 may be an automated emergency device configured to initiate an emergency communication with emergency receiver 105 in response to emergency communicator 103 being involved in an emergency event, such as, for example, a medical alert device or system, a biometric health-monitoring device, a home security or safety system, a vehicle security system, or the like.

In various embodiments, communication environment 120 may be configured to allow emergency receiver 105 to receive an emergency communication from emergency communicator 103, input data regarding the emergency communication, and/or contact (or transmit data to) emergency responder 107 based on the emergency communication, as discussed further herein. In response to receiving an emergency communication, communication environment 120 may record the emergency communication (e.g., create an electronic record of the emergency communication comprising text, audio, and/or video, as applicable). Communication environment 120 may be configured to transmit the recording (e.g., an emergency communication recording) to record management system 140, in response to the emergency communication ending. Emergency responder 107 may include any emergency responder, law enforcement officer, firefighter, emergency medical technician (EMT), paramedic, ambulance technician, animal control officer, utility service personnel, security guard, and/or the like.

Communication environment 120 may be in telephonic communication and/or electronic communication with communicator device 110 and/or responder device 150. In various embodiments, communication environment 120 may be in electronic communication with communication snippet service 130 and/or record management system 140. In various embodiments, communication environment 120 may also comprise (e.g., logically, virtually, physically, etc.) communication snippet service 130 and/or record management system 140.

Communication environment 120 may comprise one or more hardware, software, and/or database components. Communication environment 120 may comprise one or more devices, systems, clients, databases, and/or the like, that may be logically, physically, or virtually distinct. For example, communication environment 120 may comprise one or more hardware components such as a processing unit, a communications unit, a memory unit, an input device, and/or an output device. Communication environment 120 may include at least one computing device in the form of a computer or processor, or a set of computers or processors, although other types of computing units or systems may be used, such as, for example, a server, web server, pooled servers, or the like. Communication environment 120 may also comprise one or more software components configured to manage and/or interact with one or more hardware components, such as, for example, an operating system, user interfaces, software applications, and/or the like.

In various embodiments, communication environment 120 may include a telecommunications device such as, for example, a landline telephone, an IP telephone, a mobile telephone, a cellular telephone, a smart telephone, and/or the like. In various embodiments, communication environment 120 may include a computing device such as a server, a computer-based system, a portable computer-based system (e.g., a laptop, a notebook, a hand held computer, a tablet, a personal digital assistant, etc.), a cellular telephone, a smart telephone, a wearable device (e.g., a smart watch, smart glasses, etc.), an internet of things (IoT) device, and/or any other device capable of transmitting and/or receiving data over a network.

Communication environment 120 may include a processor in electronic communication with a computer-readable medium. The computer-readable medium may store, retrieve, and/or organize data. As used herein, the term "computer-readable medium" includes any storage medium that is readable by a machine (e.g., computer, processor, processing circuit, etc.). Storage medium includes any devices, materials, and/or structures used to place, keep, and retrieve data (e.g., information). A storage medium may be volatile or non-volatile. A storage medium may include any semiconductor (e.g., RAM, ROM, EPROM, flash, etc.), magnetic (e.g., hard disk drive (HDD), etc.), solid state (e.g., solid-state drive (SSD), etc.), optical technology (e.g., CD, DVD, etc.), or combination thereof. Computer-readable medium includes storage medium that is removable or non-removable from a system. Computer-readable medium may store any type of information, organized in any manner, and usable for any purpose such as computer readable instructions, data structures, program modules, or other data. The computer-readable medium may comprise a non-transitory computer-readable medium. The non-transitory, computer-readable medium may include instructions stored thereon. Upon execution by the processor, the instructions may allow the processor to perform various functions and operations disclosed herein.

In various embodiments, communication environment 120 may comprise a computer-aided dispatch (CAD) system 123. CAD system 123 may comprise any suitable hardware, software, and/or database components. CAD system 123 may comprise one or more processors, processing units, computer-based systems, servers, and/or the like. CAD system 123, and/or communication environment 120, may be in electronic communication with record management system 140. In various embodiments, CAD system 123, and/or communication environment 120, may be in electronic communication with communication snippet service 130. In various embodiments, CAD system 123, and/or communication environment 120, may comprise communication snippet service 130 (e.g., logically, physically, virtually, etc.).

CAD system 123 may be configured to provide a tool (e.g., interface, system, etc.) for emergency receiver 105 to track and allocate emergency and/or non-emergency resources. For example, CAD system 123 may allow emergency receiver 105 to track and view location information of incidents (e.g., emergencies, non-emergencies, etc.), location information of emergency responders 107, availability of emergency responders 107, and/or the like. As a further example, CAD system 123 may be configured to enable emergency receiver 105 to receive the emergency communication, input data regarding the emergency communication, perform dispatch services (including dispatching an emergency responder 107), and perform similar tasks and operations as discussed herein. In various embodiments, each emergency receiver 105 may have access to a computer-based system configured to interact with CAD system 123. In various embodiments, each emergency receiver 105 may interact directly with CAD system 123 (e.g., via a common user interface, separate user interfaces, separate CAD clients 125, etc.).

CAD system 123 (or communication environment 120) may be configured to record and/or determine properties of the emergency communication. For example, CAD system 123 may be configured to record emergency communications. CAD system 123 may record (e.g., generate an emergency communication recording, create a copy of an emergency communication, etc.) the emergency communication using any suitable technique and in any suitable format. For example, CAD system 123 may record the emergency communication in a video file format (e.g., AVI, MPEG, MOV, MP4, etc.), an uncompressed audio file format (e.g., PCM, WAV, etc.), a lossy compression audio file format (e.g., MPEG, AAC, etc.), a lossless compression audio file format (e.g., FLAC, WMA, etc.), a text-based file format (e.g., TXT, RTF, etc.), and/or the like. CAD system 123 may record the emergency communication in its native format (e.g., video communications recorded in a video format, audio communications record in an audio format, etc.). CAD system 123 may record, or convert, the emergency communication into a preferred format (e.g., all emergency communications are recorded or converted into audio format). CAD system 123 may generate a transcript of the emergency communication (or receive a transcript of the emergency communication from a separate system). CAD system 123 may implement any suitable conversion tool, converter, or software to configured to convert the emergency communication into the preferred format, including, for example, a text-to-audio converter, a text-to-video converter, an audio-to-text converter, an audio-to-video converter, a video-to-text converter, and/or a video-to audio converter. CAD system 123 may store the emergency communication recording in memory and/or may buffer and stream the emergency communication recording to another system or device (e.g., record management system 140, as discussed further herein).

CAD system 123 (or communication environment 120) may also be configured to capture a communication timestamp in response to the emergency communication being initiated, received, and/or recorded. The communication timestamp may comprise a timestamp of when the emergency communication was initiated or received by CAD system 123 (or communication environment 120) and/or when the emergency communication recording began. The communication timestamp may comprise a date and/or time (e.g., year, month, day, hour, minute, second, microsecond, etc.). The communication timestamp may comprise any suitable date and/or time format. CAD system 123 (or communication environment 120) may capture or determine the communication timestamp. The communication timestamp may be determined using any suitable process or system. For example, the communication timestamp may be determined using a Network Time Protocol (NTP), or based on an internal clock, an external clock, a network resource, a local resource, or the like.

In various embodiments, CAD system 123 may comprise, or be in electronic communication with, a computer-aided dispatch (CAD) client 125. CAD client 125 may be configured to allow emergency receiver 105 to interact with CAD system 123 and/or communication environment 120. For example, CAD client 125 may comprise a user interface of CAD system 123. CAD client 125 may be configured to accept input from emergency receiver 105 (e.g., data input, communication inputs, etc.) in response to emergency receiver 105 receiving the emergency communication from emergency communicator 103. CAD client 125 may comprise any suitable interface capable of receiving input from emergency receiver 105. For example, CAD client 125 may comprise software, a mobile application, a web interface, or the like. CAD client 125 may comprise a graphical user interface (GUI) configured to allow emergency receiver 105 to input and view data. CAD client 125 may comprise an interface hosted by or installed on CAD system 123. In various embodiments, CAD client 125 may be hosted by communication environment 120, a computer-based system, a web server, an application server, and/or the like, and accessible via CAD system 123.

Figure 2A:
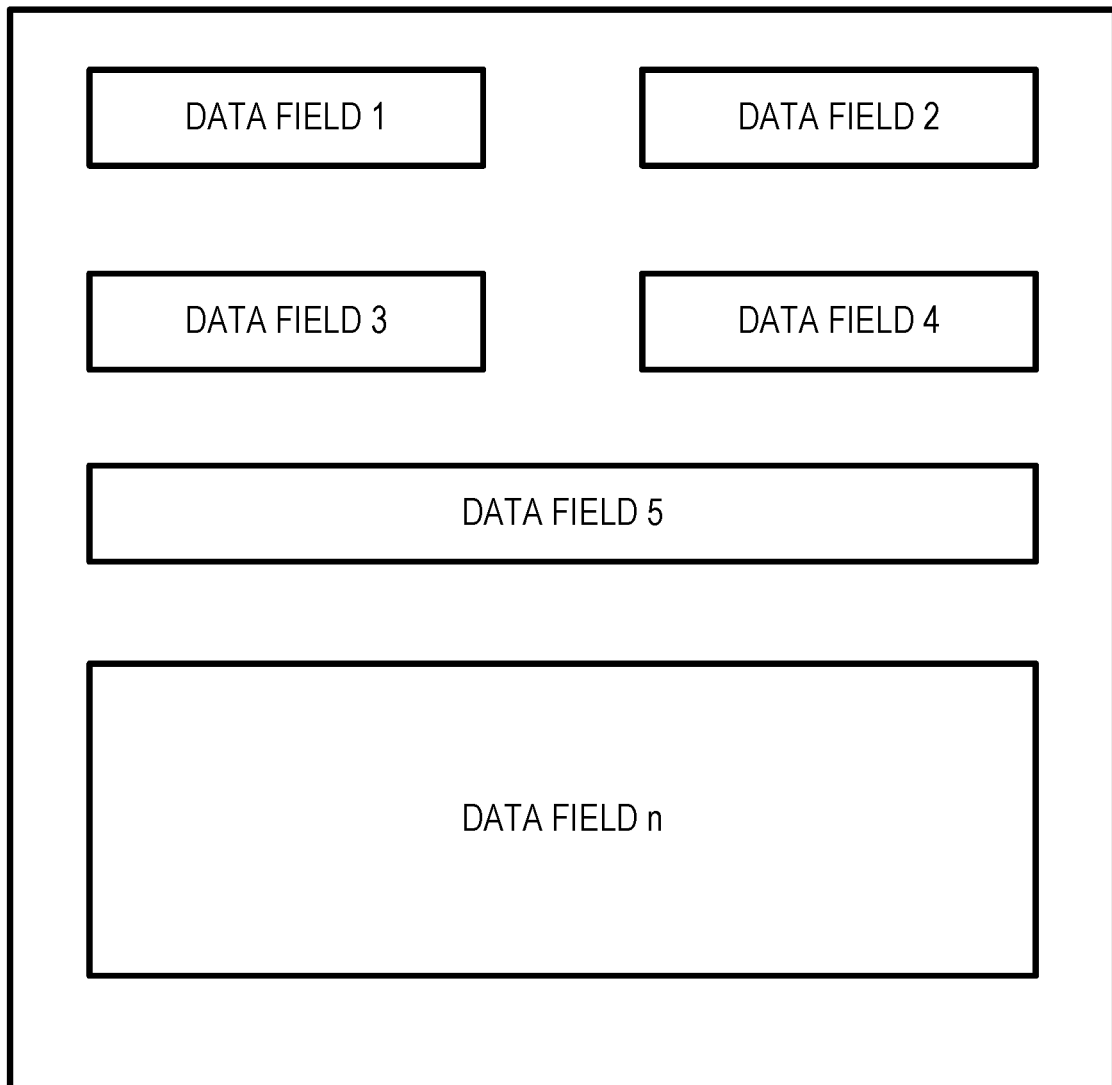
FIG. 2A is a block diagram of an exemplary computer-aided dispatch (CAD) client for use in an emergency communication system, in accordance with various embodiments.

In various embodiments, CAD client 125 may comprise one or more data fields configured to enable emergency receiver 105 to input data regarding an emergency communication. For example, in accordance with various embodiments and with reference to FIG. 2A, an exemplary CAD client 125 may comprise or display a first data field (e.g., DATA FIELD 1), a second data field (e.g., DATA FIELD 2), a third data field (e.g., DATA FIELD 3), a fourth data field (e.g., DATA FIELD 4), a fifth data field (e.g., DATA FIELD 5), and/or an "Nth" data field (e.g., DATA FIELD n). In various embodiments, an exemplary CAD client 125 may also comprise any other desired number of data fields across one or more interfaces.

Each of the data fields may correspond to categories of data that the emergency receiver 105 may gather and input into CAD client 125 during an emergency communication. For example, categories of data fields may include an event type (e.g., crime, accident, fire, medical, animal rescue, utility problem, etc.), an event priority (e.g., "low," "medium," "high," scale of 1-10, etc.), an event location (e.g., general location, street names, address, etc.), communicator data (e.g., communicator name, contact information, date of birth, etc.), offender data (e.g., suspect name, description, date of birth, address, etc.), an event narrative (e.g., description of event, party names, etc.), and/or the like. Each data field may comprise any suitable type of data field, such as, for example, a list field (e.g., drop-down box, radial buttons, check boxes, etc.), a text field (limited or unlimited), a memo field, a date field, and/or any other suitable or desired type of data field. In various embodiments, each data field may comprise or be associated with a data field identifier. The data field identifier may indicate the category of the data field. For example, the data field identifier may comprise text of the category (e.g., "event priority," "evtpri," etc.), a numerical or alphanumerical value corresponding to text of the category, or the like. The data field identifier may be stored as metadata (e.g., data field metadata), in a lookup table, or using any other method.

In various embodiments, selection of a data field having fixed inputs (e.g., a list field) may populate or select one or more other data fields. For example, selection of an event type may control which other data fields are populated (e.g., selection of a "fire" event type may populate data fields related to fire incidents, selection of a "crime" event type may populate data fields related to crime incidents, such as "suspect information," etc.). In various embodiments, one or more data fields may be prepopulated (e.g., data input without manual input) based on the emergency communication. For example, a "date" data field may be prepopulated based on the date the emergency communication is initiated or received, and/or the communication timestamp generated by CAD system 123. As a further example, "communicator data," such as a call-back phone number, may be prepopulated based on a telephone number, a device identifier, or the like received and associated with the communicator device initiating the emergency communication (e.g., an enhanced 911 system used in North America may automatically provide certain communicator details).

In various embodiments, and with reference again to FIG. 1, communication snippet service 130 may comprise any suitable hardware, software, and/or database components. Communication snippet service 130 may comprise one or more processors, processing units, computer-based systems, servers, and/or the like. For example, and in accordance with various embodiments, communication snippet service 130 may comprise a software service configured to generate communication snippets, as discussed further herein. Communication snippet service 130 may be in electronic communication with communication environment 120, CAD system 123, and/or record management system 140. In various embodiments, communication snippet service 130 may also be part of communication environment 120 and/or CAD system 123. For example, communication snippet service 130 may comprise a software service operating on CAD system 123.

Communication snippet service 130 may be configured to generate a communication snippet. The communication snippet may be configured to provide situational awareness and/or context to emergency responder 107 beyond (or in addition to) what may be received via the data input from emergency receiver 105. The communication snippet may comprise a portion of the emergency communication, or define a portion of the emergency communication. The communication snippet may correspond to one or more data inputs from emergency receiver 105 (e.g., data input into a data field of CAD client 125). In that respect, the communication snippet may comprise, or define, a portion of the emergency communication that emergency receiver 105 was receiving when entering a data input into a data field.

Communication snippet service 130 may be configured to generate the communication snippet using any suitable process. For example, communication snippet service 130 may be configured to generate the communication snippet in response to the detection of a data field action in a data field of CAD client 125. In various embodiments, communication environment 120, CAD client 125, and/or communication snippet service 130 may be configured to detect the data field action. The data field action may be detected in response to emergency receiver 105 interacting with a data field in CAD client 125. For example, the data field action may be detected in response to emergency receiver 105 focusing on a data field (e.g., entering the data field, clicking into the data field, tabbing into the data field, etc.), defocusing on a data field (e.g., exiting the data field, clicking out of the data field, tabbing away from the data field, etc.), inputting text into a data field, selecting a prefilled option from a data field, selecting a checkbox from a data field, and/or any other interaction with a data field.

In various embodiments, communication environment 120, CAD client 125, and/or communication snippet service 130 may be configured to at least partially detect the data field action based on machine learning or artificial intelligence. For example, as the emergency communication is being recorded communication environment 120, CAD client 125, and/or communication snippet service 130 may analyze the emergency communication to determine whether a portion of the emergency communication should be associated with a data field. For example, the determination may be made based on a question or statement from emergency receiver 105 (e.g., "What is your name?" may be determined to relate to a data field associated with the emergency communicator's name) and/or a word or phrase from emergency communicator 103 (e.g., "My name is John Smith" may be determined to relate to a data field associated with the emergency communicator's name). In various embodiments, communication environment 120, CAD client 125, and/or communication snippet service 130 may also be configured to detect background noise such as gunshots, dogs barking, etc. that may be manually tagged by emergency receiver 105 as a data input. In response to determining that the portion of the emergency communication should be associated with a data field, communication environment 120, CAD client 125, and/or communication snippet service 130 may detect the data field action. Communication environment 120, CAD client 125, and/or communication snippet service 130 may use any suitable machine learning or artificial intelligence algorithm, model, or technique to analyze the emergency communication. For example, communication environment 120, CAD client 125, and/or communication snippet service 130 may use supervised machine learning, unsupervised machine learning, and/or reinforcement machine learning algorithms to analyze the emergency communication. As a further example, communication environment 120, CAD client 125, and/or communication snippet service 130 may use a machine learning algorithm such as a linear regression algorithm, a logistic regression algorithm, a decision tree algorithm, a support vector machine (SVM) algorithm, a Naive Bayes algorithm, a k-nearest neighbors (kNN) algorithm, a k-means clustering algorithm, a random forest algorithm, a dimensionality reduction algorithm, a gradient boosting algorithm, and/or any other suitable machine learning or artificial intelligence algorithm, model, or process.

In various embodiments, communication environment 120, CAD client 125, and/or communication snippet service 130 may be configured to at least partially detect the data field action based on an action list of keywords or phrases. For example, the action list may comprise one or more words or phrases and the data field that those words or phrases is linked to. In various embodiments, the action list may be updated based on machine learning or artificial intelligence, as previously discussed herein. For example, historical emergency communications may be analyzed using machine learning to determine key words or phrases that should be linked to a data field.

In response to detecting a data field action, communication environment 120, CAD client 125, and/or communication snippet service 130 may determine or capture an action timestamp. The action timestamp may comprise a timestamp of when the data field action occurred, such as a date and/or time (e.g., year, month, day, hour, minute, second, microsecond, etc.). The action timestamp may comprise any suitable date and/or time format. The action timestamp may be determined using any suitable process or system. For example, the action timestamp may be determined using a Network Time Protocol (NTP), or based on an internal clock, an external clock, a network resource, a local resource, or the like.

Communication snippet service 130 may be configured to store and/or retrieve one or more snippet lengths. For example, the snippet length may be stored in memory (e.g., a snippet length repository) in communication environment 120, CAD system 123, and/or communication snippet service 130. A snippet length may be configured to define the length of a communication snippet. For example, the snippet length may define the entire length of a communication snippet, and/or a period of time before and/or after a data field action. The snippet length may also comprise a value between two data field actions (e.g., a first data field action and a second data field action), as discussed further herein. A value of the snippet length may vary dependent on a media type of the emergency communication. For example, a snippet length may define a value of time for audio and/or video-based emergency communications (e.g., 5 seconds, 10 seconds, 20 seconds, etc.), a value of text length for text-based emergency communications (e.g., 100 characters, 50 words, 1 text message, 1 paragraph, 3 sentences, etc.), and/or the like.

A snippet length may be associated with a data field and/or data field action. For example, one or more data fields may be associated with a snippet length (e.g., a first data field associated with a first snippet length, a second data field associated with a second snippet length, a third data field associated with a third snippet length, a fourth data field associated with a fourth snippet length, a fifth data field associated with a fifth snippet length, an Nth data field associated with an Nth snippet length, etc.). As a further example, one or more data field actions may be associated with a snippet length (e.g., a focusing data field action associated with a first snippet length, a defocusing data field action associated with a second snippet length, an inputting text data field action associated with a third snippet length, a selecting a prefilled option data field action associated with a fourth snippet length, a selecting a checkbox data field action associated with a fifth snippet length, etc.). A snippet length may be stored to comprise data, metadata, tags, or the like (e.g., a data field identifier, a data field action identifier, etc.) indicating the data field and/or data field action that the snippet length is associated with.

A snippet length may also comprise a snippet length type, such as, for example, a pre-action length, a post-action length, and/or a total length. The pre-action length may define a snippet length value before a data field action is determined (e.g., −5 seconds, −10 words, etc.). The post-action length may define a snippet length value after a data field action is determined (e.g., +5 seconds, +10 words, etc.). A total length may define a snippet length value encompassing the entire length of a communication snippet (e.g., 10 seconds, 20 words, etc.).

A snippet length, the snippet length type, and associations between data fields and/or data field actions, may be established using any suitable process. For example, a user may manually input and establish the snippet lengths, data field associations, and/or data field action associations. The user may manually update snippet lengths to increase or decrease a given value of a snippet length. In various embodiments, a value of a snippet length may be established based on the data field associated with the snippet length. For example, a data field expected to receive a greater amount of data input (e.g., a narrative data field) may comprise a snippet length with a great value compared to a data field expected to receive a lesser amount of data input (e.g., a contact name data field).

In various embodiments, a value of a snippet length may also be updated using machine learning, artificial intelligence, and/or similar feedback processes. Communication environment 120, CAD system 123, and/or communication snippet service 130 may use any suitable machine learning or artificial intelligence algorithm, model, or technique, or feedback process, to establish or update the value of a snippet length. For example, communication environment 120, CAD system 123, and/or communication snippet service 130 may use any suitable supervised machine learning, unsupervised machine learning, and/or reinforcement machine learning algorithm discussed herein to establish or update the value of a snippet length. As a further example, and in accordance with various embodiments, communication environment 120, CAD system 123, and/or communication snippet service 130 may receive feedback (e.g., communication snippet feedback, communication snippet revision request, etc.) regarding the usefulness of a communication snippet. The feedback may be received from emergency responder 107 or a similar party or system with access to a given communication snippet. Based on the feedback communication environment 120, CAD system 123, and/or communication snippet service 130 may update a snippet length to comprise a shorter value or a longer value.

Communication snippet service 130 may generate a communication snippet based on the snippet value associated with a detected data field action and/or the data field that the data field action occurred in. For example, the communication snippet may be generated to comprise a snippet start time and a snippet end time. The snippet start time and the snippet end time may be based on the action timestamp of the data field action and the snippet length. For example, in response to the snippet length defining only a total length, the snippet start time may be the same as the action timestamp (e.g., 9:15:30 AM) and the snippet end time may comprise the action timestamp offset by the snippet length (e.g., 9:15:30 AM offset by a snippet length of 10 seconds would yield a snippet end time of 9:15:40 AM). As a further example, in response to the snippet length defining a pre-action length and a post-action length, the snippet start time may comprise the action timestamp offset by the pre-action length (e.g., 9:15:30 AM offset by a pre-action length of 10 seconds would yield a snippet end time of 9:15:20 AM) and the snippet end time may comprise the action timestamp offset by the post-action length (e.g., 9:15:30 AM offset by a post-action length of 10 seconds would yield a snippet end time of 9:15:40 AM). As a further example, in response to the snippet length being defined by two data field actions (e.g., a focusing data field action and a defocusing data field action), the snippet start time may comprise the same value as the action timestamp corresponding to the first data field action (e.g., a focusing data field action), and the snippet end time may comprise the same value as the action timestamp corresponding to the second data field action (e.g., a defocusing data field action).

In various embodiments, communication snippet service 130 may generate the communication snippet to comprise a portion of the emergency communication defined by the snippet start time and the snippet end time. In that regard, communication snippet service 130 may capture the portion of the emergency communication defined by the snippet start time and snippet end time (e.g., relative to the communication timestamp), and generate the communication snippet as an audio snippet, a video snippet, and/or a text-based snippet. As a further example, communication snippet service 130 may generate the communication snippet to comprise data, metadata, bookmarks, tags, and/or the like (collectively, "markers") defining a portion of an emergency communication. For example, the communication snippet may comprise markers indicating timestamps associated with the snippet start time and the snippet end time.

As discussed further herein, communication snippet service 130 may transmit the communication snippet to responder device 150. Communication snippet service 130 may also transmit the communication snippet to record management system 140 for storage.

In various embodiments, record management system 140 may be configured to receive, provide, manage, and/or store record data. Record management system 140 may include at least one computing device in the form of a computer or processor, or a set of computers or processors, although other types of computing units or systems may be used, such as, for example, a processing circuit, a server, web server, pooled servers, or the like. Record management system 140 may comprise a database management system (DBMS) configured to define, manipulate, retrieve, and manage data in a database or data structure. Record management system 140 may comprise a record database 145 configured to store and maintain the record data. Record database 145 may comprise any suitable database, data structure, or the like capable of storing and maintaining data. Record database 145 may store and maintain the record data using any suitable process. Record management system 140 may be in electronic communication with communication environment 120 and/or communication snippet service 130.

In various embodiments, record management system 140 may be an evidence management system. An evidence management system receives, provides, manages, and/or stores evidence. An evidence management system may store evidence received by a responder agency (e.g., an agency associated with the emergency responder), a receiver agency (e.g., an agency associated with the emergency receiver), and/or the like. For example, in a practical application the evidence management system may store evidence received from a law enforcement agency. The evidence may include any type of data including text, audio, image, and/or video. The evidence may be stored on servers or databases (e.g., record database 145) and accessed via a network. An evidence management system may include a server to perform the functions of an evidence management system. The server may include one or more servers and/or computing devices. The server may control other electronic devices to perform the functions of an evidence management system. The server may include engines and data stores which operate to store and process data and metadata received from systems and devices in system 100. In various embodiments, record management system 140 may comprise a cloud-based distributed evidence management system, such as, for example, AXON EVIDENCE offered by Axon Enterprise, Inc.

The record data stored in record management system 140 may comprise data associated with emergency communications received in communication environment 120. For example, the record data may comprise data ingested from the emergency communication (e.g., telephone number, IP address, etc. originating the emergency communication), data inputs from the emergency communication, emergency communication recordings, communication snippets, revised communication snippets, and/or the like. The data may each be assigned an identifier (e.g., an event ID, a record ID, a call for service (CFS) ID, etc.) to correlate associated data records. In various embodiments, the communication snippets and revised communication snippets may comprise data, metadata, bookmarks, and/or the like indicating timestamps (e.g., a snippet start time, a snippet end time, etc.) associated with the emergency communication. In various embodiments, the communication snippets and/or revised communication snippets may also comprise portions of text, audio, and/or video from the emergency communication. The record data may also comprise data regarding the emergency receiver (e.g., the call-taker, the dispatcher, etc.), data regarding the emergency responder, a status of the emergency communication, and/or the like.

In various embodiments, the record data may relate to an event (e.g., incident, emergency, non-emergency, etc.). The record data may provide a record of the event and the occurrences that took place during the event. The record data may be used as evidence to establish the occurrences of the event.

In various embodiments, responder device 150 (e.g., emergency responder device, emergency device, mobile data terminal, mobile digital computer, etc.) may be configured to allow emergency responder 107 to communicate with emergency receiver 105. For example, in response to emergency receiver 105 receiving an emergency communication, emergency receiver 105 may communicate with emergency responder 107 to dispatch emergency responder 107 based on the emergency communication. Responder device 150 may also be configured to receive data inputs generated during an emergency communication. For example, responsive to the emergency communication, and/or the communication between emergency receiver 105 and emergency responder 107, CAD system 123 (and/or communication environment 120) may transmit the data inputs to responder device 150. Emergency responder 107 may interact with the data inputs via responder device 150. Responder device 150 may also be configured to receive communication snippets associated with the data inputs. Responder device 150 may receive the communication snippets from communication environment 120, CAD system 123, and/or communication snippet service 130. For example, responsive to the emergency communication, transmission of the data inputs, and/or the communication between emergency receiver 105 and emergency responder 107, emergency environment 120, CAD system 123, and/or communication snippet service 130 may transmit the communication snippets to responder device 150. Emergency responder 107 may interact with the communication snippets via responder device 150.

Responder device 150 may be in communication with communication environment 120. For example, and in accordance with various embodiments, responder device 150 may be in communication with communication environment 120 via a telecommunications network (e.g., a telephonic communication). The telecommunications network may include a public switched telephone network (PSTN), a cellular network or mobile network, a private telephone network (e.g., a private branch exchange (PBX)), an integrated services digital network (ISDN), and/or the like. As a further example, and in accordance with various embodiments, responder device 150 may be in electronic communication with communication environment 120. Responder device 150 may also be in electronic communication with CAD system 123 and/or communication snippet service 130.

Responder device 150 may comprise any combination of hardware and/or software components. For example, responder device 150 may comprise hardware such as a processing unit, a communications unit, a memory unit, an input device, and/or an output device. Responder device 150 may also comprise software configured to manage and/or interact with the hardware components, such as, for example, an operating system, user interfaces, software applications, and/or the like. In various embodiments, responder device 150 may comprise a telecommunications device such as, for example, a mobile telephone, a cellular telephone, a smart telephone (e.g., IPHONE®, BLACKBERRY®, ANDROID etc.), and/or the like. In various embodiments, responder device 150 may be a computing device such as a server, a computer-based system, a portable computer-based system (e.g., a laptop, a notebook, a hand held computer, a tablet, a personal digital assistant, etc.), a cellular telephone, a smart telephone, a wearable device (e.g., a smart watch, smart glasses, etc.), an internet of things (IoT) device, and/or any other device capable of transmitting and/or receiving data over a network.

In various embodiments, responder device 150 may comprise a mobile data terminal (MDT), mobile digital computer (MDC), and/or similar device used in emergency and non-emergency vehicles to communicate with computer-aided dispatching systems. An MDT, MDC, or similar device may facilitate communications with emergency receiver 105 (e.g., via CAD system 123), and may also be configured to display data relevant to the emergency communication, such as, for example, location data, data inputs, communication snippets, etc.

In various embodiments, responder device 150 may also comprise equipment carried or used by emergency responder 107. For example, in response to emergency responder 107 being a law enforcement officer, the responder device 150 may comprise a body camera (e.g., a recording device configured to be worn by the law enforcement officer), a radio, a conducted electrical weapon (CEW), and/or the like. The body camera may comprise a camera configured to digitally capture an image (e.g., a static image, a video, etc.), together with an audio input (e.g., microphone) and an audio output (e.g., audio speaker). The responder device 150 may also comprise a camera mounted on the vehicle of emergency responder 107.

In various embodiments, emergency responder 107 may have or interact with a plurality of responder devices 150. For example, emergency responder 107 may have a computer-based system together with additional equipment (as discussed herein). The plurality of responder devices may be in electronic communication with each other. For example, an emergency responder's mobile data terminal may be in electronic communication with the emergency responder's body camera, smart phone, and/or CEW.

Figure 2B:
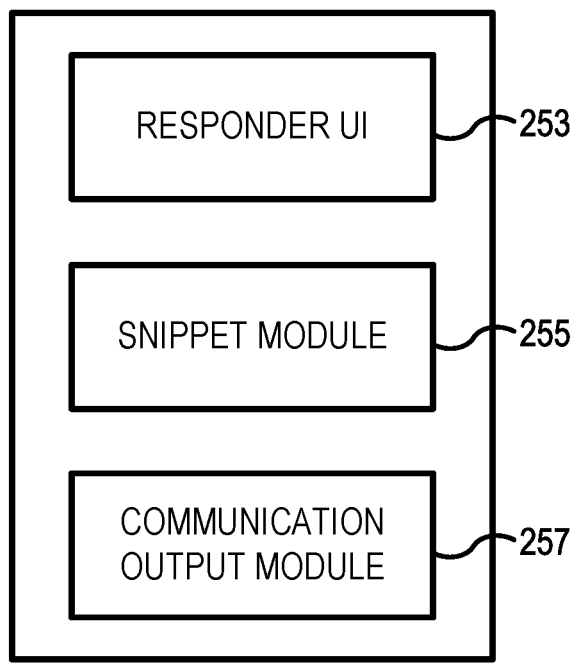
FIG. 2B is a block diagram of an exemplary emergency responder device for use in an emergency communication system, in accordance with various embodiments.

In various embodiments, and with reference to FIG. 2B, a responder device 150 may comprise a responder user interface (UI) 253, a snippet module 255, and/or a communication output module 257. Responder device 150 may also comprise location services configured to provide location details for emergency responder 107. The location services may comprise an onboard global positioning system (GPS) which provides location details (e.g., coordinates) of responder device 150. The location services may also comprise a compass which provides a direction of view or movement of responder device 150, and/or an accelerometer which may detect a speed and/or acceleration of movement of responder device 150. Collectively, the information collected by the location services may be referred to as "location information." The location services may also comprise tools, software, and the like configured to gather, associate, store, and/or transmit the location information.

Responder UI 253 may be configured to display data on responder device 150 and enable emergency responder 107 to view and interact with the data, as discussed further herein.

Responder UI 253 may comprise software, a mobile application, a web interface, or the like. Responder UI 253 may comprise a graphical user interface (GUI) configured to allow emergency responder 107 to view, interact with, and input data.

Snippet module 255 may be configured to allow responder device 150 to electronically communicate with communication snippet service 130 (e.g., directly or via communication environment 120 or CAD system 123). For example, snippet module 255 may be configured to receive a communication snippet from communication snippet service 130. Snippet module 255 may allow emergency responder 107 to interact with the communication snippet (and/or associated data inputs) via responder device 150. For example, emergency responder 107 may interact with the communication snippet to review the communication snippet (e.g., read, listen, watch, etc.). Emergency responder 107 may interact with responder device 150 to review a data input and the communication snippet associated with that data input.

Snippet module 255 may also allow emergency responder 107 to generate a communication snippet revision request. For example, in response to emergency responder 107 determining that the communication snippet is too short (either at the beginning or the end), emergency responder 107 may desire to revise the communication snippet to comprise a longer (or shorter) length. The communication snippet revision request may comprise a post-snippet revision value and/or a pre-snippet revision value. The post-snippet revision value may define a value to add to the end of the communication snippet (e.g., 5 seconds, 4 sentences, etc.). The pre-snippet revision value may define a value to add to the beginning of the communication snippet (e.g., 5 seconds, 4 sentences, etc.). Snippet module 255 may be configured to transmit the communication snippet revision request to communication snippet service 130. In response to communication snippet service 130 processing the communication snippet revision request, snippet module 255 may receive in return a revised communication snippet, as discussed further herein.

Communication output module 257 may be configured to output the communication snippets (and/or data inputs). Communication output module 257 may comprise hardware and/or software configured to output communication snippets, such as, for example, a display device (e.g., monitor, touchscreen, monochrome display, colored display, CRT, LCD, LED, projector, video card, etc.), an audio output device (e.g., speaker, headphones, sound card, etc.), and/or the like. Communication output module 257 may also communicate with responder UI 253 to output video and/or text. In various embodiments, communication output module 257 may also communicate with an external device or system to output the communication snippet (e.g., a speaker in a vehicle). The output of the communication snippet may be based on the media type of the communication snippet, an output capability of communication output module 257, and/or a user preference. For example, in response to the communication snippet being audio the output may be available in an audio format and/or a text format (e.g., using an audio-to-text conversion tool). In response to the communication output module having audio-only output capabilities, the communication snippet may be available for output only in an audio format. As a further example, in response to the communication snippet being video and audio, the output may be available in a video format, an audio format, and/or a text format (e.g., using an audio-to-text conversion tool). The user preference may be manually input or selected to control output of communication snippets (e.g., all communication snippets are output as audio).

In various embodiments, communication output module 257 (and/or responder device 150) may also be configured to receive an audio input from emergency responder 107. Communication output module 257 (and/or responder device 150) may comprise hardware and/or software components configured to capture audio input such as, for example, a microphone. Communication output module 257 may comprise speech recognition capabilities. For example, communication output module 257 (and/or responder device 150) may comprise a voice service, a voice activation technology, or the like configured to recognize and ingest a voice command, and perform one or more operations based on the voice command. In various embodiments, communication output module 257 (and/or responder device 150) may passively accept voice commands and may require an activation word (e.g., a wake word, a hot word, a trigger word, a wake up word, etc.) to activate. Emergency responder 107 may interact with communication output module 257 to review a communication snippet and/or data input (e.g., "Play the communication snippet" or "Activate service. Play the communication snippet"), generate a revised communication snippet (e.g., "add time to the communication snippet," "add 5 seconds to the communication snippet," "add 5 seconds before the start of the communication snippet," "more time," etc.), and/or perform any other operation or action discussed herein.

Figure 3:
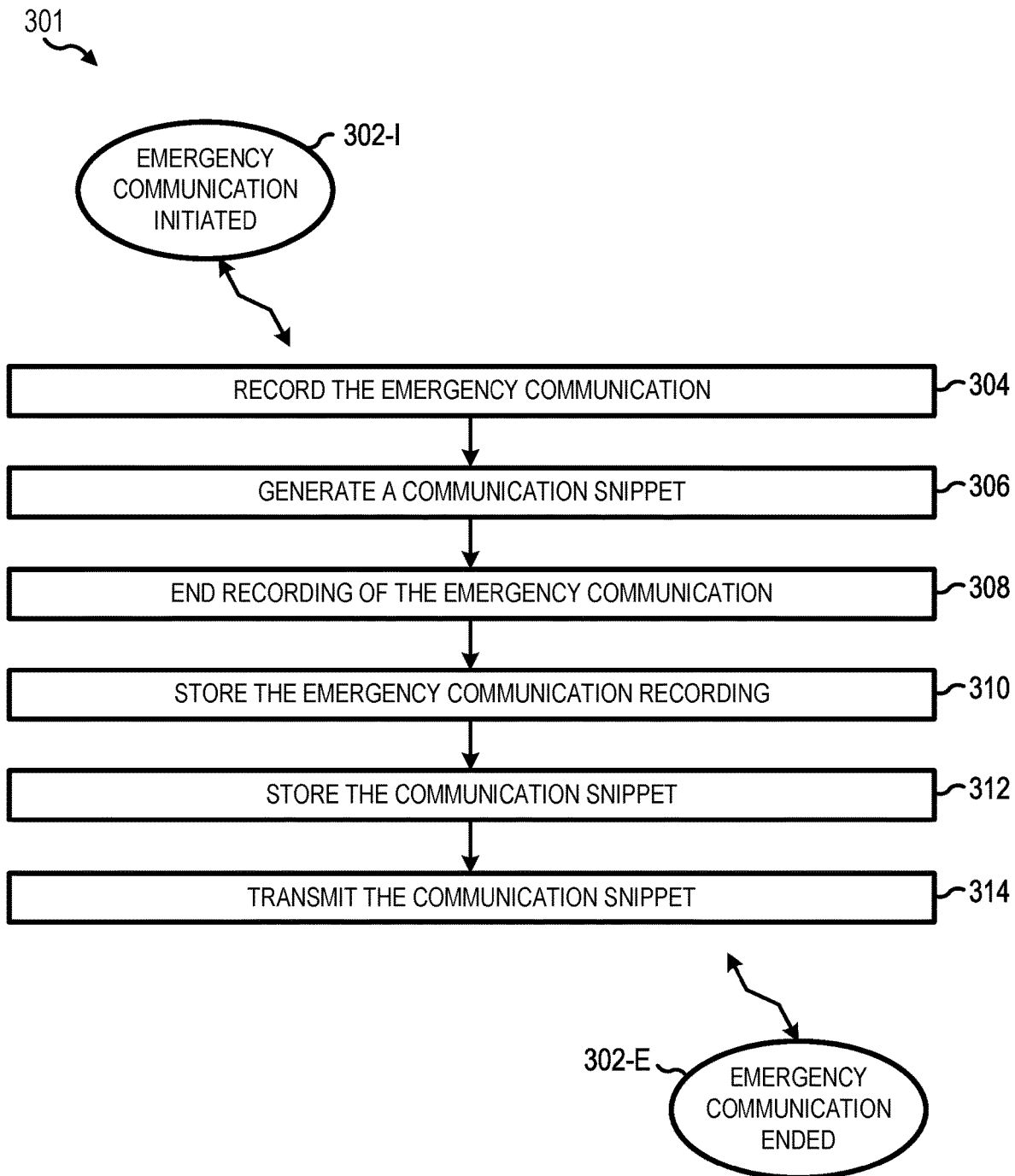
FIG. 3 illustrates a process flow for a method of processing an emergency communication, in accordance with various embodiments.
Figure 4:
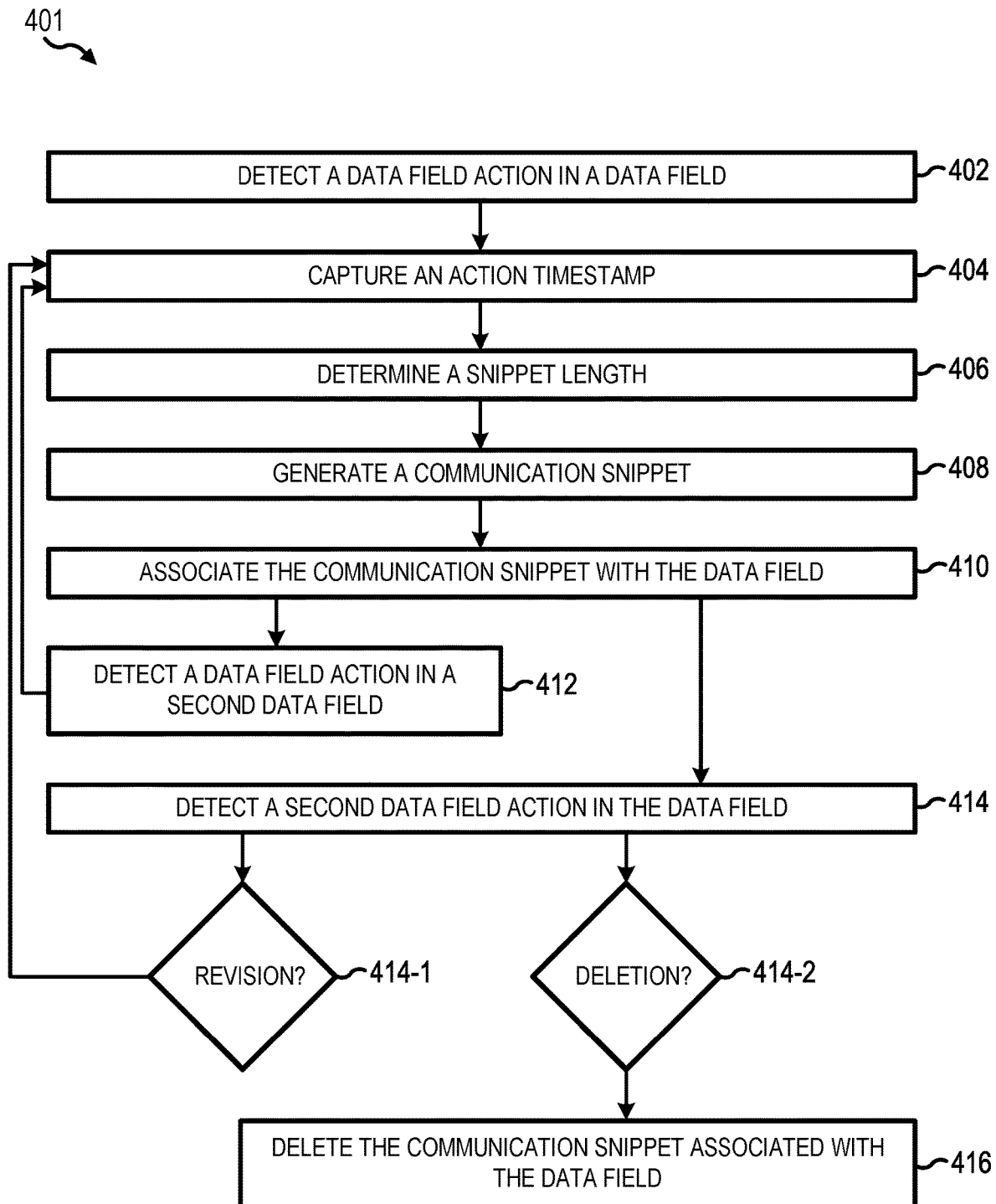
FIG. 4 illustrates a process flow for a method of generating a communication snippet, in accordance with various embodiments.
Figure 5:
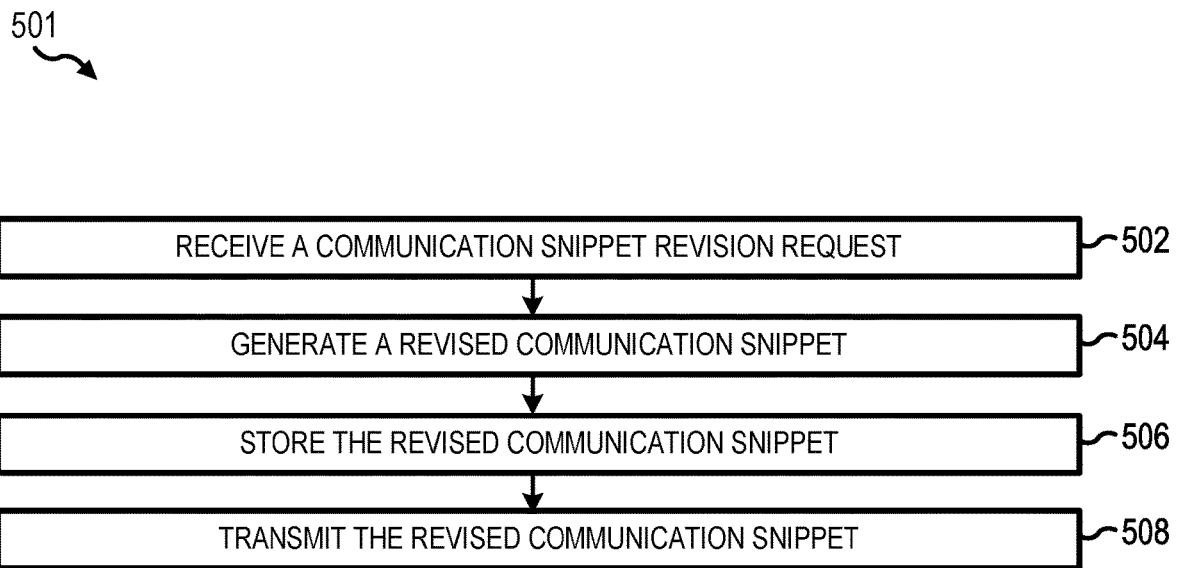
FIG. 5 illustrates a process flow for a method of revising a communication snippet, in accordance with various embodiments.

Referring now to FIGS. 3-5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3-5, but also to the various system components as described above with reference to FIGS. 1, 2A, and 2B.

In various embodiment, and with specific reference to FIG. 3, a method 301 for processing an emergency communication is disclosed. Method 301 may begin in response to an emergency communication being initiated (step 302-I). In various embodiments, method 301 may complete in response to the emergency communication being ended (step 302-E). In various embodiments, one or more steps of method 301 may also be performed after the emergency communication has ended (step 302-E).

The emergency communication may be initiated by an emergency communicator (e.g., emergency communicator 103). The emergency communication may comprise audio, images, video, and/or text. The emergency communicator may initiate the emergency communication via any communication means enabling audio, image, video, and/or text communications. For example, the emergency communicator may initiate the emergency communication via a communicator device (e.g., communicator device 110). The emergency communication may be transmitted (e.g., electronically, telephonically, etc.) by the communicator device to a communication environment (e.g., communication environment 120) of an emergency receiver (e.g., emergency receiver 105).

In various embodiments, in response to the emergency communication being initiated (e.g., step 302-I), the system may record the emergency communication (step 304). For example, the communication environment, a computer-aided dispatch (CAD) system (e.g., CAD system 123), and/or any other suitable system or device may receive and begin recording the emergency communication (e.g., generate an emergency communication recording). The system may record the emergency communication using any suitable technique and in any suitable format. For example, the system may record the emergency communication in its native format (e.g., video communications recorded in a video format, audio communications record in an audio format, etc.). The system may record, or convert, the emergency communication into a preferred format (e.g., all emergency communications are recorded or converted into audio format, a text-based transcript is generated, etc.). The system may store the emergency communication recording in memory and/or may buffer and stream the emergency communication recording to another system or device (e.g., record management system 140).

In response to the emergency communication being initiated or in response to the emergency communication being recorded, the system may capture a communication timestamp (e.g., a communication start timestamp). The communication timestamp may comprise a timestamp of when the emergency communication was initiated or received by the system and/or when the emergency communication recording began, such as a date and/or time (e.g., year, month, day, hour, minute, second, microsecond, etc.). The communication timestamp may comprise any suitable date and/or time format. The communication timestamp may be determined using any suitable process or system. For example, the communication timestamp may be determined using a Network Time Protocol (NTP), or based on an internal clock, an external clock, a network resource, a local resource, or the like.

During the emergency communication, the emergency receiver may select or input data into various data fields in the system. For example, the emergency receiver may interact with a CAD client (e.g., CAD client 125) to input the data. The data input may comprise relevant information from the emergency communication, as determined by the emergency receiver. The data fields may group the data input into categories of data, such as, for example, an event type, an event, an event location, communicator data, offender data, an event narrative, and/or the like.

The system may generate a communication snippet (step 306) based on the emergency communication. The communication snippet may comprise a portion of the emergency communication, or define a portion of the emergency communication. The communication snippet may correspond to one or more data inputs from the emergency receiver. In that respect, the communication snippet may comprise a portion of the emergency communication that the emergency receiver (or communication environment) was receiving when entering a data input into a data field.

In various embodiments, the communication snippet may be generated automatically upon receipt of a data input, such that a first input to the system (e.g., the emergency communication) is automatically processed in response to receipt of a second, concurrent input to the system (e.g., the data input). In embodiments, functionality and efficiency of the system may be increased, enabling a single data input to both instruct processing of a first set of data (e.g., data associated with the emergency communication) and provide a second, additional set of data (e.g., text data directly from the data input).

The communication snippet may be generated using any technique or process. For example, in accordance with various embodiments and with specific reference to FIG. 4, a method 401 for generating a communication snippet is disclosed.

The system may detect a data field action in a data field (step 402). For example, the system may detect the data field action in a CAD client of a CAD system (e.g., CAD client 125 of CAD system 123). The data field action may be detected in response to the emergency receiver interacting with a data field in the CAD client (e.g., data field 1, data field 2, data field 3, data field 4, data field 5, data field n, etc.). For example, the data field action may be detected in response to the emergency receiver focusing on a data field (e.g., entering the data field, clicking into the data field, tabbing into the data field, etc.), defocusing on a data field (e.g., exiting the data field, clicking out of the data field, tabbing away from the data field, etc.), inputting text into a data field, selecting a prefilled option from a data field, selecting a checkbox from a data field, and/or any other interaction or action with a data field.

In various embodiments, the system may at least partially detect the data field action based on machine learning or artificial intelligence. For example, as the system records the emergency communication the system may analyze the emergency communication to determine whether a portion of the emergency communication should be associated with a data field. For example, the determination may be made based on a question or statement from the emergency receiver (e.g., "What is your name?" may be determined to relate to a data field associated with the emergency communicator's name) and/or a word or phrase from the emergency communicator (e.g., "My name is John Smith" may be determined to relate to a data field associated with the emergency communicator's name). In various embodiments, the system may also be configured to detect background noise such as gunshots, dogs barking, etc. that may be manually tagged by the emergency receiver as a data input. In response to determining that the portion of the emergency communication should be associated with a data field, the system may detect the data field action. The system may use any suitable machine learning or artificial intelligence algorithm, model, or technique to analyze the emergency communication. For example, the system may use supervised machine learning, unsupervised machine learning, and/or reinforcement machine learning algorithms to analyze the emergency communication. As a further example, the system may use a machine learning algorithm such as a linear regression algorithm, a logistic regression algorithm, a decision tree algorithm, a support vector machine (SVM) algorithm, a Naive Bayes algorithm, a k-nearest neighbors (kNN) algorithm, a k-means clustering algorithm, a random forest algorithm, a dimensionality reduction algorithm, a gradient boosting algorithm, and/or any other suitable machine learning or artificial intelligence algorithm, model, or process.

The system may capture an action timestamp (step 404) in response to detecting the data field action. For example, the CAD client, the CAD system, and/or a communication snippet service (e.g., communication snippet service 130) may be configured to capture the action timestamp. The action timestamp may comprise a timestamp of when the data field action occurred, such as a date and/or time (e.g., year, month, day, hour, minute, second, microsecond, etc.). The action timestamp may comprise any suitable date and/or time format. The action timestamp may be determined using any suitable process or system. For example, the action timestamp may be determined using a Network Time Protocol (NTP), or based on an internal clock, an external clock, a network resource, a local resource, or the like.

The system may determine a snippet length (step 406). In various embodiments, the system may determine the snippet length in response to capturing the action timestamp (e.g., step 404). In various embodiments, the system may determine the snippet length in response to detecting the data field action (e.g., step 402), or a plurality of data field actions. The communication snippet service may be configured to determine the snippet length. The snippet length may be retrievable by the system. For example, the snippet length may be stored in memory in the communication environment, the CAD system, and/or the communication snippet service. As discussed further herein, a snippet length may be associated with a data field (e.g., data field identifier) and/or a data field action (e.g., a data field action identifier). In response to detecting the data field action, the system may retrieve the snippet length associated with that data field action. In response to detecting a data field action, the system may retrieve the snippet length associated with the data field that the data field action occurred in.

In various embodiments, the snippet length may at least partially define the length of a communication snippet. For example, the snippet length may define the entire length of a communication snippet, and/or a period of time before and/or after a data field action. The snippet length may also comprise a value between two data field actions (e.g., a first data field action and a second data field action), as discussed further herein. A value of the snippet length may vary dependent on a media type of the emergency communication. For example, a snippet length may define a value of time for audio and/or video-based emergency communications (e.g., 5 seconds, 10 seconds, 20 seconds, etc.), a value of text length for text-based emergency communications (e.g., 100 characters, 50 words, 1 text message, 1 paragraph, 3 sentences, etc.), and/or the like. Although many examples discussed herein refer to the snippet length as a value of time, it should be appreciated by one skilled in the art that the same examples could be applied for snippet lengths defining a value of text length, and/or any other type of value.

The snippet length may comprise a value less than the length of an emergency communication (e.g., a portion of the emergency communication). The snippet length may be determined independent from the length of an emergency communication. As an example, an emergency communication may comprise a plurality of distinct communication snippets each comprising non-overlapping portions of the emergency communication. As a further example, an emergency communication may comprise a plurality of distinct communication snippets each comprising portions of the emergency communication that may partially, but not wholly, overlap. A snippet start time and a snippet end time may be independent of an emergency communication start time and an emergency communication end time. As an illustrative example, an emergency communication may comprise an emergency communication start time of 9:30:00 and an emergency communication end time of 9:40:00, a first communication snippet of the emergency communication may be defined by a snippet start time of 9:42:15 and a snippet end time of 9:42:40, a second communication snippet of the emergency communication may be defined by a snippet start time of 9:47:25 and a snippet end time of 9:47:45, etc.

In various embodiments, the system may determine the snippet length based on the data field that a data field action occurred in. For example, one or more data fields may be associated with a snippet length (e.g., a first data field associated with a first snippet length, a second data field associated with a second snippet length, a third data field associated with a third snippet length, a fourth data field associated with a fourth snippet length, a fifth data field associated with a fifth snippet length, an Nth data field associated with an Nth snippet length, etc.). The snippet length may define the entire length of a communication snippet, and/or a period of time before and/or after a data field action. In response to a data field action occurring in a data field, the system may retrieve the snippet length associated with that data field.

In various embodiments, one or more data fields may not be associated with a snippet length. In that respect, a data input for each of one or more data fields may not result in generation of a corresponding communication snippet. For example, a "date" data field may not be associated with a snippet length, and/or any other data field associated with a data input that does not need to be transmitted to emergency responder 107.

In various embodiments, the system may determine the snippet length based on the data field action. For example, one or more data field actions may be associated with a snippet length (e.g., a focusing data field action associated with a first snippet length, a defocusing data field action associated with a second snippet length, an inputting text data field action associated with a third snippet length, a selecting a prefilled option data field action associated with a fourth snippet length, a selecting a checkbox data field action associated with a fifth snippet length, etc.). In response to a data field action occurring in a data field, the system may retrieve the snippet length associated with that data field action.

In various embodiments, a data input for each of one or more data fields may not result in generation of a corresponding communication snippet when the data input is received. For example, detection of a data field action that results in a zero and/or undefined data input may result in no generation of a communication snippet.

In various embodiments, the system may determine the snippet length based on the data field action and the data field that the data field action occurred in. For example, a data field may be associated with a plurality of snippet lengths dependent on the data field action detected in the data field. For example, a first data field may comprise a first snippet length associated with a focusing data field action, a second snippet length associated with a defocusing data field action, etc.

As a further example, one or more data field actions may be associated with a snippet length and a snippet length type (or a plurality of snippet lengths types each having a distinct snippet length). A snippet length type may comprise a pre-action length, a post-action length, and/or a total length. The pre-action length may define a snippet length value before a data field action is determined (e.g., −5 seconds). The post-action length may define a snippet length value after a data field action is determined (e.g., +5 seconds). A total length may define a snippet length value encompassing the entire length of a communication snippet (e.g., 10 seconds). In response to a data field action occurring in a data field, the system may retrieve the snippet length and snippet length type associated with that data field action.

The system may determine the snippet length based on a detection of two data field actions. In accordance with various embodiments, the snippet length may comprise a value between a first data field action (e.g., a focusing data field action) and a second data field action (e.g., a defocusing data field action). For example, in response to a first action timestamp of the first data field action comprising a value of 9:15:30 AM and a second action timestamp of the second data field action comprising a value of 9:15:40 AM, the snippet length may comprise a value of 10 seconds. In accordance with various embodiments, the snippet length may define a value between a first data field action (e.g., a focusing data field action) and a second data field action (e.g., a defocusing data field action), together with a pre-action length for the first data field action and/or a post-action length for the second data field action. For example, in response to a first action timestamp of the first data field action comprising a value of 9:15:30 AM, a second action timestamp of the second data field action comprising a value of 9:15:40 AM, the pre-action length comprising a value of 5 seconds, and the post-action length comprising a value of 5 seconds, the snippet length may comprise a total value of 20 seconds.

The snippet length, and associations between data fields and/or data field actions, may be established using any suitable process. For example, a user may manually input and establish the snippet lengths, data field associations, and/or data field action associations. The user may manually update snippet lengths to increase or decrease a given value of a snippet length. In various embodiments, a value of a snippet length may be established based on the data field associated with the snippet length. For example, a data field expected to receive a greater amount of data input (e.g., a narrative data field) may comprise a snippet length with a greater value compared to a data field expected to receive a lesser amount of data input (e.g., a contact name data field).

In various embodiments, the system may establish or update a value of a snippet length using machine learning, artificial intelligence, and/or any other similar feedback processes. The system may use any suitable machine learning or artificial intelligence algorithm, model, or technique, or feedback process, to establish or update the value of a snippet length. For example, the system may use any suitable supervised machine learning, unsupervised machine learning, and/or reinforcement machine learning algorithm discussed herein to establish or update the value of a snippet length. As a further example, and in accordance with various embodiments, the system may receive feedback (e.g., communication snippet feedback) regarding the usefulness of a communication snippet. The feedback may be received from an emergency responder or similar party with access to a given communication snippet. The feedback may include whether a communication snippet is desired to be shorter or longer. The system may also receive a communication snippet revision request (e.g., step 502, with brief reference to FIG. 5) detailing a communication snippet desired to be shorter or longer. Based on the communication snippet feedback and/or the communication snippet revision request, the system may update a snippet length to comprise a shorter or longer value.

The system may generate a communication snippet (step 408). For example, the communication snippet service may generate the communication snippet. The communication snippet may be generated based on the emergency communication, the data field action, and the snippet length. The communication snippet may be generated to comprise a snippet identifier, and/or any other data, metadata, tag, or the like configured to identify the communication snippet.

The communication snippet may be generated to comprise a snippet start time and a snippet end time. The snippet start time and the snippet end time may be based on the action timestamp of the data field action and the snippet length. For example, in response to the snippet length defining only a total length, the snippet start time may be the same as the action timestamp (e.g., 9:15:30 AM) and the snippet end time may comprise the action timestamp offset by the snippet length (e.g., 9:15:30 AM offset by a snippet length of 10 seconds would yield a snippet end time of 9:15:40 AM). As a further example, in response to the snippet length defining a pre-action length and a post-action length, the snippet start time may comprise the action timestamp offset by the pre-action length (e.g., 9:15:30 AM offset by a pre-action length of 10 seconds would yield a snippet end time of 9:15:20 AM) and the snippet end time may comprise the action timestamp offset by the post-action length (e.g., 9:15:30 AM offset by a post-action length of 10 seconds would yield a snippet end time of 9:15:40 AM). As a further example, in response to the snippet length being defined by two data field actions (e.g., a focusing data field action and a defocusing data field action), the snippet start time may comprise the same value as the action timestamp corresponding to the first data field action (e.g., a focusing data field action), and the snippet end time may comprise the same value as the action timestamp corresponding to the second data field action (e.g., a defocusing data field action).

In various embodiments, the communication snippet may be generated to comprise a portion of the emergency communication defined by the snippet start time and the snippet end time. In that regard, the system may capture the portion of the emergency communication defined by the snippet start time and snippet end time (e.g., relative to the communication timestamp), and generate the communication snippet as an audio snippet, a video snippet, and/or a text-based snippet. In various embodiments, the communication snippet may be generated to comprise data, metadata, bookmarks, tags, and/or the like (collectively, "markers") defining a portion of an emergency communication. For example, the communication snippet may comprise markers indicating timestamps associated with the snippet start time and the snippet end time. Generating the communication snippet to comprise only markers indicating the bounds of a communication snippet may decrease the file size of the communication snippet. Decreasing the file size of the communication snippet may decrease transmission and storage times, and may decrease the amount of memory needed to store the communication snippet.

The system may associate the communication snippet with the data field (step 410). For example, in response to the system generating the communication snippet, the communication snippet service, the communication environment, and/or the CAD system may associate the communication snippet with the data field. The system may associate the communication snippet with the data field by generating the communication snippet to comprise the data field identifier, appending the data field identifier to the communication snippet, and/or through any other associative technique or process.

In various embodiments, the system may also associate the communication snippet with the data input. Associating the communication snippet with the data input may provide additional context to the emergency responder without the emergency responder needing to interact with the entire emergency communication. In that respect, and as discussed further herein, the communication snippet may be transmitted together with the associated data input to the emergency responder. The communication environment and/or the CAD system may be configured to associate the communication snippet with the data input. For example, the communication snippet may be appended to the data input and associated with the data field such that the data input and the communication snippet for a given data field are group together.

In various embodiments, the system may continue to generate communication snippets in response to a user (e.g., the emergency receiver) inputting data into each of the data fields. In that regard, the system may generate a communication snippet corresponding to each data field that the user has input data into.

For example, the system may detect a data field action in a second data field (step 412). The second data field may be different from the (first) data field. The system may detect the (second) data field action similar to detecting the (first) data field action (e.g., step 402). The (second) data field action may be detected in response to the emergency receiver interacting with the second data field in the CAD client. For example, the (second) data field action may be detected in response to the emergency receiver focusing on the second data field, defocusing from the second data field, inputting data into the second data field, selecting a prefilled option from the second data field, selecting a checkbox from the second data field, and/or any other interaction with the second data field. In response to detecting the (second) data field action, the system may repeat one or more of steps 404, 406, 408, and 410 of method 401 to generate a second communication snippet associated with the second data field. In various embodiments, the system may iteratively repeat steps 402-410 of method 401 to continue generating communication snippets for each data field that a data field action occurs in during the emergency communication.

In various embodiments, the system may modify a communication snippet in response to a user (e.g., the emergency receiver) interacting with the same data field. For example, in response to the user editing, deleting, and/or entering new data into a data field that already has a communication snippet associated with it, the system may generate a new communication snippet comprising or defining a portion of the emergency communication occurring during the editing, deleting, and/or inputting of new data. The new communication snippet may include the original communication snippet and/or may replace the original communication snippet, as discussed further herein.

For example, and in accordance with various embodiments, the system may detect a second data field action in the data field (step 414). The system may detect the second data field action similar to detecting the (first) data field action (e.g., step 402, step 412). The second data field action may be detected in response to the emergency receiver interacting with the data field in the CAD client. The second data field action may be detected in response to the emergency receiver interacting with the data input in the data field, such as, for example, by revising the data input or deleting the data input. As discussed herein, a revision to the data input may include any change to the data input that is not a deletion of the entire data input. For example, a revision may include adding to the data input, partially deleting from the data input, and/or the like. As discussed herein, a deletion to the data input may include a deletion of the entire data input in the data field. In various embodiments, a "deletion of the entire data input" may include deletion of a majority or substantial portion of the data input, and may be defined based on user input, machine learning, or similar processes.

In various embodiments, in response to the second data field action comprising a revision (step 414-1) to the data input in the data field, the system may generate a second communication snippet. For example, the system may execute, or repeat, one or more of steps 404, 406, 408, and 410 of method 401 to generate a second communication snippet associated with the data field. In various embodiments, the system may separately generate the second communication snippet such that the (first) communication snippet and the second communication snippet each exist independently. In various embodiments, the system may also merge the second communication snippet with the (first) communication snippet to form a single communication snippet. In various embodiments, the system may generate the second communication snippet and store the second communication snippet as a version (e.g., v2) of the (first) communication snippet (e.g., v1).

In various embodiments, in response to the second data field action comprising a deletion (step 414-2) of the data input from the data field, the system may delete the communication snippet associated with the data field (step 416). In response to the user interacting with the data field again (e.g., inputting data back into the data field), the system may repeat steps 402-410 to generate a new communication snippet associated with the data field.

In various embodiments, and with specific reference again to FIG. 3, the system may end the recording of the emergency communication (step 308). For example, in response to the emergency communication being ended (e.g., step 302-E), the system may stop recording he emergency communication. In various embodiments, the system may also stop recording the emergency communication in response to a user input (e.g., a user manually stopping recording of the emergency communication).

In response to the emergency communication being ended, the system may capture a communication timestamp (e.g., a communication end timestamp). The communication timestamp may comprise a timestamp of when the emergency communication was ended or when the system stopped recording the emergency communication. The communication timestamp may comprise any suitable date and/or time format. The communication timestamp may be determined using any suitable process or system. For example, the communication timestamp may be determined using a Network Time Protocol (NTP), or based on an internal clock, an external clock, a network resource, a local resource, or the like.

The system may store the emergency communication recording (step 310). For example, the communication environment and/or the CAD system may transmit the emergency communication recording to a record management system (e.g., record management system 140) for storage. The record management system may store the emergency communication recording using any process and storage means (e.g., record database 145). The system may store the communication snippet (step 312). For example, the communication environment, the CAD system, and/or the communication snippet service may transmit the communication snippet and/or data input to the record management system. The record management system may store the communication snippet and/or data input using any process and storage means (e.g., record database 145).

In various embodiments, the record management system may group and track data corresponding to each emergency communication (and/or interrelated emergency communications). For example, the record management system, the communication environment, and/or the CAD system may assign and append an identifier (e.g., an event ID, a record ID, a call for service (CFS) ID, etc.) to the emergency communication recording, the communication snippet, the data input, and/or any other data collected, ingested, and/or generated during an emergency communication. In that regard, all data associated with an emergency communication (and/or interrelated emergency communications) may be sorted and/or grouped together.

The system may transmit the communication snippet (step 314) to an emergency responder. For example, the communication environment, the CAD system, and/or the communication snippet service may transmit the communication snippet and/or data input to a responder device (e.g., responder device 150). The system may transmit the communication snippet and/or data input to the responder device as part of a dispatch process (including before, during, or after the dispatch) to dispatch an emergency responder based on the emergency communication. In embodiments, the system may transmit the communication snippet (step 314) to a responder device (e.g., responder device 150) immediately after the snippet is generated (step 306) in order to provide the emergency responder with current information regarding an ongoing event. In embodiments, the system may transmit the communication snippet (step 314) to a responder device (e.g., responder device 150) concurrently with storing the emergency communication recording (step 310), concurrently with storing the communication snippet (step 312), and/or prior to ending recording of the emergency communication (step 308). In further embodiments, the system may transmit the communication snippet (step 314) while the communication snippet is being generated (step 306) in order to provide information from the emergency communication to a responder device (e.g., responder device 150) as soon as it becomes available at a CAD system (e.g., CAD system 123). For example, a first part of a communication snippet received prior to an action timestamp may be transmitted to a responder device while a second part of the communication snippet after the action timestamp is still being received and recorded by a CAD system, thereby minimizing a delay between generation and transmission of the communication snippet.

In response to receive the communication snippet and/or the associated data input, the emergency responder may interact with the responder device to retrieve the communication snippet and/or the associated data input. The responder device may comprise a user interface (e.g., responder UI 253) configured to display information about the data input and/or communication snippet. For example, the responder device may display the data field name or identifier associated with the data input and/or communication snippet, together with information about the data input and/or communication snippet. For example, the information may comprise a visual tag indicating that a data input and/or communication snippet is available for that data field name or identifier (e.g., a data input visual tag or button, a communication snippet visual tag or button, etc.). In that regard, the emergency responder may interact with the visual tag to receive the data input and/or communication snippet. As a further example, the information may comprise the data input and/or communication snippet. In that regard, the emergency responder may directly receive the data input and/or the communication snippet via the user interface (e.g., a text-based format).

The emergency responder may read the data input via the user interface on the responder device. Using a text-to-audio service or software, the emergency responder may also select or pre-configure the responder device to audibly project the data input via a speaker (e.g., communication output module 257) on the responder device (and/or a speaker in electronic communication with the responder device, such as via a vehicle audio system). The emergency responder may select or preconfigure the responder device to audibly and/or visually project the communication snippet via a speaker and/or user interface on the responder device (and/or a speaker and/or user interface in electronic communication with the responder device). For example, the responder device may comprise interface options to play, pause, stop, restart, etc. the communication snippet. In embodiments wherein the communication snippet is text-based (e.g., natively or via an audio-to-text service or software), the responder device may also display the communication snippet via the user interface.

In various embodiments, the emergency responder may desire to revise the communication snippet. For example, based on the snippet length associated with the data field or data field action, the generated communication snippet may comprise a length that does not fully capture relevant information from the emergency communication. In that regard, the emergency responder may desire to revise the communication snippet to comprise a greater length (or shorter length in response to the communication snippet being too long).

In various embodiments, and with specific reference to FIG. 5, a method 501 for revising a communication snippet is disclosed. The system may receive a communication snippet revision request (step 502). The communication snippet revision request may comprise a post-snippet revision value and/or a pre-snippet revision value. The post-snippet revision value may define a value to add to the end of the communication snippet (e.g., 5 seconds, 4 sentences, etc.). The pre-snippet revision value may define a value to add to the beginning of the communication snippet (e.g., 5 seconds, 4 sentences, etc.). In various embodiments, a communication snippet revision request may comprise a snippet shift value. The snippet shift value may define a value to add to the beginning and the end of the communication snippet. For example, a 5 second snippet shift would shift the beginning of the communication snippet by 5 seconds and the end of the communication snippet by 5 seconds, thus shifting the timing of the communication snippet forward 5 seconds (similarly, a −5 second snippet shift would shift the timing of the communication snipper backward 5 seconds).

In various embodiments, the communication snippet revision request may also comprise the snippet identifier. For example, the responder device (e.g., responder device 150 and/or snippet module 255) may transmit the communication snippet revision request to the communication environment, the CAD system, and/or the communication snippet service. The responder device may transmit the communication snippet revision request based on interaction from the emergency responder. For example, the emergency responder may interact with a user interface (e.g., responder UI 253) of the responder device to transmit the communication snippet revision request. The emergency responder may also audibly interact with the responder device (e.g., via communication output module 257), such as, for example, by issuing a voice command (e.g., "add time to the communication snippet," "add 5 seconds to the communication snippet," "add 5 seconds before the start of the communication snippet," "shift forward 10 seconds," etc.).

The system may generate a revised communication snippet (step 504) based on the communication snippet revision request. The system may generate the revised communication snippet similar to generating the (original) communication snippet (e.g., step 408 of method 401). For example, the communication environment, the CAD system, and/or the communication snippet service may be configured to generate the revised communication snippet. The revised communication snippet may be generated based on the emergency communication, the (original) communication snippet, and/or the communication snippet revision request. The revised communication snippet may be generated to comprise a snippet identifier, and/or any other data, metadata, tag, or the like configured to identify the communication snippet. The snippet identifier may uniquely identify the revised communication snippet. In various embodiments the snippet identifier of the revised communication snippet may also be the same as the snippet identifier of the (original) communication snippet, or a version of the same snippet identifier.

The revised communication snippet may be generated to comprise a revised snippet start time and/or a revised snippet end time. For example, in response to the communication snippet revision request comprising a post-snippet revision value, the revised snippet end time may be a function of the (original) snippet end time and the post-snippet revision value. In response to the communication snippet revision request comprising a pre-snippet revision value, the revised snippet start time may be a function of the (original) snippet start time and the pre-snippet revision value.

As an example, a (original) communication snippet may define a snippet start time of 9:30:05 and a snippet end time of 9:30:45. A communication snippet revision request may define a post-snippet revision value of 10 seconds. A revised communication snippet may be generated to comprise a revised snippet start time of 9:30:05 and a revised snippet end time of 9:30:55. As a further example, a (original) communication snippet may define a snippet start time of 9:30:05 and a snippet end time of 9:30:45. A communication snippet revision request may define a pre-snippet revision value of 10 seconds and a post-snippet revision value of 15 seconds. A revised communication snippet may be generated to comprise a revised snippet start time of 9:29:55 and a revised snippet end time of 9:31:00.

Based on the revised snippet start time and/or the revised snippet end time, the system may generate the revised communication snippet from the emergency communication. For example, and in accordance with various embodiments, the revised communication snippet may comprise a portion of the emergency communication defined by the revised snippet start time and the revised snippet end time.

The system may store the revised communication snippet (step 506). The system may store the revised communication snippet similar to storing the (original) communication snippet (e.g., step 312 of method 301). For example, the communication environment, the CAD system, and/or the communication snippet service may transmit the revised communication snippet the record management system. The record management system may store the revised communication snippet using any process and storage means (e.g., record database 145). In various embodiments, the system may store the revised communication snippet separate from the (original) communication snippet. In various embodiments, the revised communication snippet may be stored as a version (e.g., v2) of the (original) communication snippet (e.g., v1). In various embodiments, the system may delete the (original) communication snippet and replace it with the revised communication snippet.

The system may transmit the revised communication snippet (step 508). The system may transmit the revised communication snippet similar to transmitting the (original) communication snippet (e.g., step 314 of method 301). For example, the communication environment, the CAD system, and/or the communication snippet service may transmit the revised communication snippet to the responder device. In response to the responder device receiving the revised communication snippet, the emergency responder may interact with the responder device to review the revised communication snippet.

In various embodiments, data regarding the communication snippet revision requests and/or the revised communication snippets may be ingested into a machine learning and/or artificial intelligence model or process. Results from the machine learning and/or artificial intelligence model or process may be used to update snippet lengths for the associated data fields and/or data field actions. For example, the results may be used to increase (or decrease) total snippet lengths, pre-snippet lengths, and/or post-snippet lengths for future generated communication snippets.

In various embodiments, a communication snippet revision request may also comprise data to be associated with the communication snippet (e.g., communication snippet associated data). For example, the communication snippet associated data may be captured by equipment carried or used by emergency responder 107, such as a body camera, a vehicle camera, a radio, a conducted electrical weapon (CEW), or the like. For example, in response to a communication snippet and data input being associated with a communicator name, the communication snippet associated data may comprise an identification card (e.g., drivers license, passport, etc.) captured by emergency responder 107 and corresponding to emergency communicator 103. In that regard, in response to receiving a communication snippet revision request comprising communication snippet associated data, the system may store the communication snippet associated data in record management system 140 and may associate the communication snippet associated data with the communication snippet, the data input, and/or the emergency communication recording.

Figure 6:
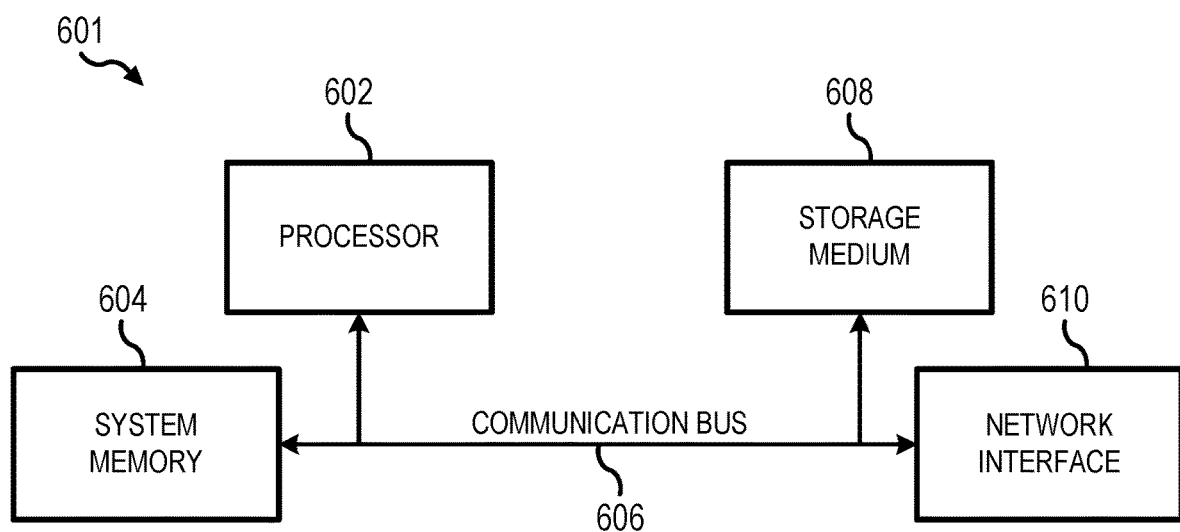
FIG. 6 is a block diagram illustrating components of a computer-based system, in accordance with various embodiments.

In various embodiments, and with reference to FIG. 6, an exemplary computer-based system 601 is disclosed. Computer-based system 601 may be appropriate for use in accordance with embodiments of the present disclosure. The accompanying description of computer-based system 601 may be applicable to servers, personal computers, mobile phones, smart phones, tablet computers, embedded computing devices, and other currently available or yet-to-be-developed devices that may be used in accordance with embodiments of the present disclosure.

Computer-based system 601 may include a processor 602 and a system memory 604 connected by a communication bus 606. Depending on the exact configuration and type of computer-based system, system memory 604 may be volatile or nonvolatile memory, such as read only memory ("ROM"), random access memory ("RAM"), EEPROM, flash memory, or other memory technology. Those of ordinary skill in the art and others will recognize that system memory 604 typically stores data and/or program modules that are immediately accessible to and/or currently being operated on by processor 602. In this regard, processor 602 may serve as a computational center of computer-based system 601 by supporting the execution of instructions. Processor 602 may comprise one or more processing units, as discussed further herein. System memory 604 may comprise one or more memory units, as discussed further herein.

Computer-based system 601 may include a network interface 610 comprising one or more components for communicating with other devices and systems over a network. Embodiments of the present disclosure may access basic services that utilize network interface 610 to perform communications using common network protocols. Network interface 610 may comprise a communications unit, as discussed further herein.

Computer-based system 601 may also include a storage medium 608. However, services may be accessed using a computer-based system that does not include means for persisting data to a local storage medium. Therefore, storage medium 608 depicted in FIG. 6 is optional. Storage medium 608 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 608 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 604 and storage medium 608 depicted in FIG. 6 are examples of computer-readable media.

For ease of illustration and because it is not important for an understanding of the claimed subject matter, FIG. 6 does not show some of the typical components of many computer-based systems. In this regard, computer-based system 601 may include input devices, such as a keyboard, keypad, mouse, trackball, microphone, video camera, touchpad, touchscreen, electronic pen, stylus, and/or any other input device described herein. Such input devices may be coupled to computer-based system 601 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 601 (e.g., a client device), or can be integral components of computer-based system 601. In some embodiments, multiple input devices may be combined into a single, multi-function input device (e.g., a video camera with an integrated microphone).

Computer-based system 601 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 601, or can be integral components of computer-based system 601. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations.

Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    receiving, by an emergency responder device, a plurality of data inputs related to an emergency communication, wherein each data input of the plurality of data inputs is related to a portion of a plurality of portions of the emergency communication;
    receiving, by the emergency responder device, a communication snippet associated with a data input from the plurality of data inputs, wherein the communication snippet comprises the portion of the plurality of portions of the emergency communication related to the data input of the plurality of data inputs, wherein the communication snippet is configured to provide context to the data input from the plurality of data inputs, and wherein the communication snippet comprises audio data;
    displaying, by the emergency responder device, the data input from the plurality of data inputs as a visual output; and
    outputting, by the emergency responder device, the communication snippet as an audible output.

2. The method of claim 1, further comprising generating, by the emergency responder device, a communication snippet revision request associated with the communication snippet.

3. The method of claim 2, wherein the communication snippet revision request comprises at least one of a post-snippet revision value or a pre-snippet revision value.

4. The method of claim 2, further comprising receiving, by the emergency responder device, a revised communication snippet based on the communication snippet revision request, wherein the revised communication snippet is associated with the data input.

5. The method of claim 2, further comprising receiving, by the emergency responder device, a voice command, wherein at least one of the displaying the data input, the outputting the communication snippet, or the generating the communication snippet revision request is responsive to the voice command.

6. The method of claim 1, further comprising receiving, by the emergency responder device, a voice command, wherein at least one of the displaying the data input or the outputting the communication snippet is responsive to the voice command.

7. The method of claim 1, further comprising outputting, by the emergency responder device, the data input from the plurality of data inputs as a second audible output, wherein the second audible output is separate from the audible output.

8. The method of claim 1, wherein the receiving the plurality of data inputs and the receiving the communication snippet is during a dispatch process to dispatch an emergency responder associated with the emergency responder device based on the emergency communication.

9. The method of claim 1, wherein the receiving the communication snippet comprises receiving a first portion of the communication snippet and receiving separately a second portion of the communication snippet, and wherein the first portion is received prior to the second portion.

10. The method of claim 9, wherein the first portion of the communication snippet is received during generation of the communication snippet, and wherein the second portion of the communication snippet is received after generation of the communication snippet.

11. A mobile data terminal (MDT) for an emergency responder comprising:
    a processor; and
    a tangible, non-transitory memory configured to communicate with the processor, the tangible, non-transitory memory having instructions stored thereon that, in response to execution by the processor, cause the processor to perform operations comprising:
        receiving, by the processor, a plurality of data inputs related to an emergency communication, wherein each data input of the plurality of data inputs is related to a portion of a plurality of portions of the emergency communication;
        receiving, by the processor, a communication snippet associated with a data input from the plurality of data inputs, wherein the communication snippet comprises the portion of the plurality of portions of the emergency communication related to the data input of the plurality of data inputs, wherein the communication snippet is configured to provide context to the data input from the plurality of data inputs, and wherein the communication snippet comprises audio data;
        displaying, by the processor, the data input from the plurality of data inputs as a visual output; and
        outputting, by the processor, the communication snippet as an audible output.

12. The MDT of claim 11, further comprising generating, by the processor, a communication snippet revision request associated with the communication snippet.

13. The MDT of claim 12, wherein the communication snippet revision request comprises at least one of a post-snippet revision value or a pre-snippet revision value.

14. The MDT of claim 12, further comprising receiving, by the processor, a revised communication snippet based on the communication snippet revision request, wherein the revised communication snippet is associated with the data input.

15. The MDT of claim 12, further comprising receiving, by the processor, a voice command, wherein at least one of the displaying the data input, the outputting the communication snippet, or the generating the communication snippet revision request is responsive to the voice command.

16. The MDT of claim 11, further comprising receiving, by the processor, a voice command, wherein at least one of the displaying the data input or the outputting the communication snippet is responsive to the voice command.

17. The MDT of claim 11, further comprising outputting, by the processor, the data input from the plurality of data inputs as a second audible output.

18. The MDT of claim 11, wherein the receiving the plurality of data inputs and the receiving the communication snippet is during a dispatch process to dispatch an emergency responder based on the emergency communication.

19. The MDT of claim 11, wherein the receiving the communication snippet comprises receiving a first portion of the communication snippet and receiving separately a second portion of the communication snippet, and wherein the first portion is received prior to the second portion.

20. The MDT of claim 19, wherein the first portion of the communication snippet is received during generation of the communication snippet, and wherein the second portion of the communication snippet is received after generation of the communication snippet.

* * * * *